(12) United States Patent
Blyth et al.

(10) Patent No.: US 9,511,777 B2
(45) Date of Patent: Dec. 6, 2016

(54) VEHICLE AND METHOD OF CONTROL THEREOF

(71) Applicant: Jaguar Land Rover Limited, Whitley Coventry Warwickshire (GB)

(72) Inventors: Michael Blyth, Worcester (GB); Paul Beever, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/407,334

(22) PCT Filed: Jun. 10, 2013

(86) PCT No.: PCT/EP2013/061900
§ 371 (c)(1),
(2) Date: Dec. 11, 2014

(87) PCT Pub. No.: WO2013/186164
PCT Pub. Date: Dec. 19, 2013

(65) Prior Publication Data
US 2015/0127237 A1 May 7, 2015

(30) Foreign Application Priority Data
Jun. 11, 2012 (GB) .................................. 1210273.7

(51) Int. Cl.
*B60W 40/105* (2012.01)
*B60W 30/18* (2012.01)
(52) U.S. Cl.
CPC ...... *B60W 40/105* (2013.01); *B60W 30/18172* (2013.01); *B60W 2520/10* (2013.01);
(Continued)

(58) Field of Classification Search
CPC .................... B60W 40/105; B60W 30/18712; B60W 2520/10; B60W 2520/26; B60W 2520/28; B60W 2720/28
(Continued)

(56) References Cited

U.S. PATENT DOCUMENTS

| 5,402,345 | A | 3/1995 | Kost |
| 2011/0239762 | A1 | 10/2011 | Rulka et al. |
| 2011/0295481 | A1 | 12/2011 | Boeker et al. |

FOREIGN PATENT DOCUMENTS

| DE | 19625270 A1 | 1/1998 |
| DE | 19936710 A1 | 2/2001 |

(Continued)

OTHER PUBLICATIONS

Machine Translation of DE 10044821 published Nov. 2001.*
(Continued)

*Primary Examiner* — Anne M Antonucci
(74) *Attorney, Agent, or Firm* — Reising Ethington P.C.

(57) ABSTRACT

Embodiments of the present invention provide a control system for a motor vehicle, the control system being operable to determine a vehicle speed value corresponding to a speed of travel of the vehicle over a surface according to a value of a speed of a wheel of the vehicle, the control system being operable to: cause a reduction in an amount of drive torque applied to at least one of a plurality of driven wheels; obtain a value of a speed of rotation of the at least one wheel while the amount of drive torque applied thereto is reduced; and determine the vehicle speed value according to the measured value of wheel speed, wherein the system is configured to determine whether the vehicle speed value obtained according to the speed of the wheel following the reduction in torque applied to the wheel is consistent with one or more vehicle speed measurements made by alternative means.

19 Claims, 2 Drawing Sheets

(52) U.S. Cl.
CPC ..... *B60W 2520/26* (2013.01); *B60W 2520/28* (2013.01); *B60W 2720/28* (2013.01)

(58) Field of Classification Search
USPC .......................................................... 701/70
See application file for complete search history.

(56) References Cited

FOREIGN PATENT DOCUMENTS

| | | |
|---|---|---|
| DE | 10044821 A1 | 11/2001 |
| DE | 10343070 A1 | 4/2005 |
| DE | 102009002360 A1 | 10/2010 |
| EP | 1440860 A1 | 7/2004 |
| WO | WO2009060090 A1 | 5/2009 |
| WO | WO2011054724 A1 | 5/2011 |

OTHER PUBLICATIONS

Machine Translation of DE 102009002360 published Oct. 2010.*
International Search Report for application No. PCT/EP2013/061900, dated Sep. 30 2013, 5 pages.
UK Combined Search and Examination Report for corresponding application No. GB1210273.7, dated Oct. 15, 2012, 6 pages.
Written Opinion for application No. PCT/EP2013/061900 dated Sep. 30, 2013, 5 pages.

* cited by examiner

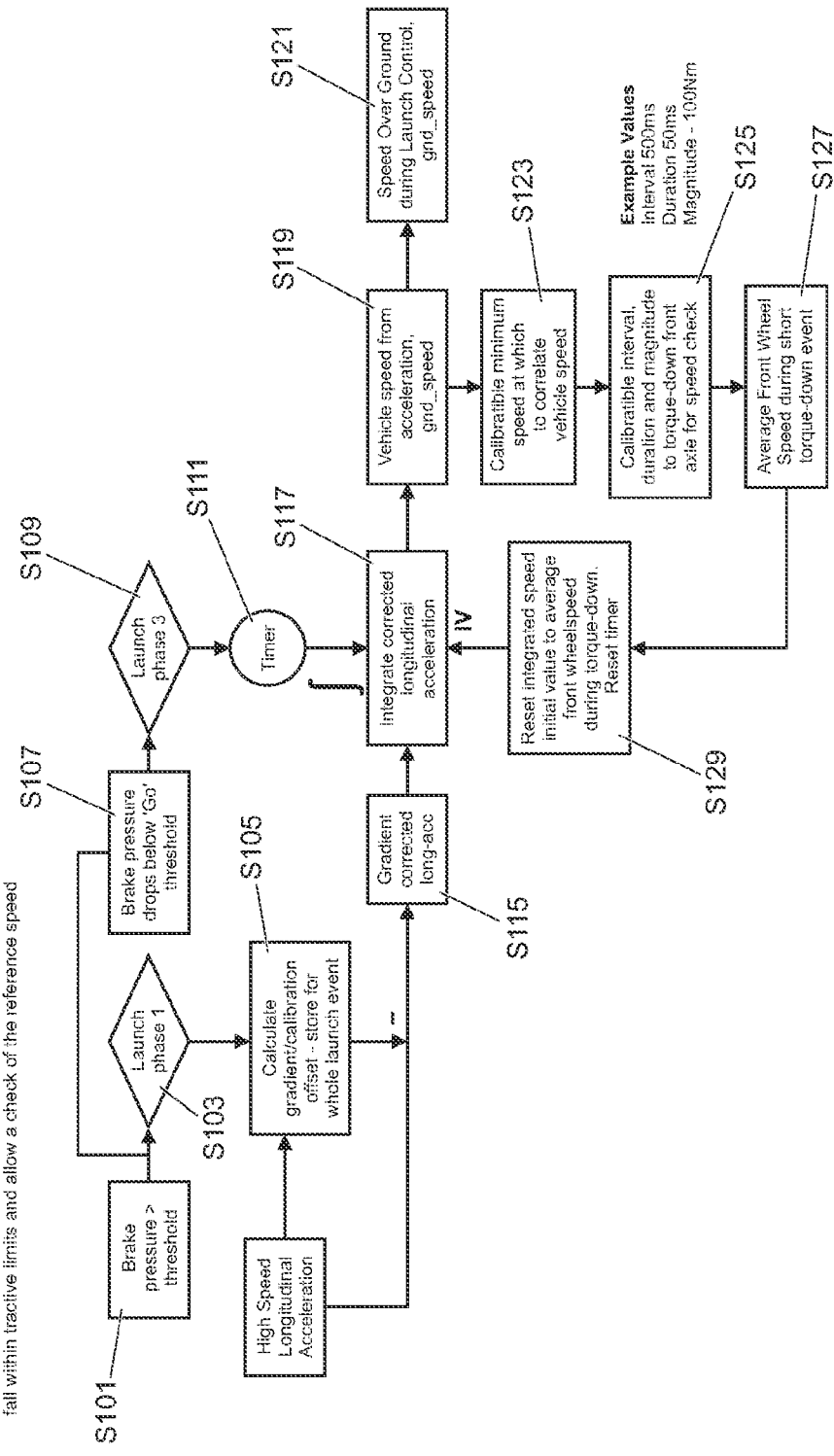

VEHICLE AND METHOD OF CONTROL THEREOF

FIELD OF THE INVENTION

The present invention relates to motor vehicles and in particular, but not exclusively, to a method of determining a speed of a motor vehicle.

BACKGROUND

Traction control systems, also known as anti-slip regulation (ASR) systems, are used on vehicles to prevent loss of traction of the driven wheels so as to maintain control of the vehicle and to prevent deterioration of the accelerating performance due to longitudinal slip of the driving wheels. Traction control is necessary, for example, when excessive accelerator input is applied by the driver and the condition of the road surface is unable to cope with the torque applied.

Feedback control methods are typically employed in such systems, whereby the slip of the driving wheels (wheel slip) is monitored and, when it becomes excessive due to an excessive driving torque (e.g. sudden application of the accelerator pedal), appropriate action is taken to reduce the engine output and/or to apply a braking force to the driving wheels. Traction control may be implemented within the engine control unit (ECU) of the vehicle to reduce engine torque by retarding or suppressing the spark to one or more cylinders of the engine, reducing fuel supply to one or more of the engine cylinders, closing the throttle, or, in turbocharged vehicles, actuating the boost control solenoid to reduce boost and therefore engine power. Additionally, the wheel brake to one or more of the wheels may be applied to control wheel slip.

Traction control systems are typically implemented in a vehicle as part of a stability control system (SCS) operable to enhance stability of a vehicle by detecting and reducing skidding. If a skid is detected whilst cornering, the stability control system is arranged automatically to apply braking to individual wheels to assist a driver in steering the vehicle in an intended direction, for example around a corner.

A problem has been found with existing traction control systems that accurate estimation or measurement of vehicle speed using currently known techniques can be unreliable, particularly in four wheel drive vehicles with high drive torque capability. Electric propulsion motors offer particularly high values of drive torque for motor vehicle applications, and are capable of delivering relatively high rates of change of torque. It is found that current stability control technologies may be inadequate to maintain vehicle stability in some situations, for example when the driver demands high acceleration from rest.

For known stability control systems it is of fundamental importance to know the speed of the vehicle at any given moment in time. Speed may be measured by one of a number of different techniques, including measurement of wheel speed by means of one or more wheel speed sensors. In the case of a two wheel drive vehicle, measurement of speed of rotation of the non-driven wheels typically enables a reliable estimation of vehicle speed to be made at any given moment in time based on measurement of the speed of rotation of the non-driven wheels even if the driven wheels are experiencing excessive slip.

However, in the case of a four wheel drive vehicle, under conditions of harsh acceleration it is possible that each of the four wheels experiences excessive slip such that a wheel speed measurement will indicate that the vehicle speed is greater than it actually is. This can result in inappropriate behaviour of a stability control system.

It is an object of the invention to provide an improved control system for a vehicle which addresses one or more of the aforementioned problems.

STATEMENT OF THE INVENTION

Embodiments of the invention may be understood with reference to the appended claims.

Aspects of the present invention provide a vehicle and a method.

In an aspect of the invention for which protection is sought there is provided a control system for a motor vehicle, the control system being operable to determine a vehicle speed value corresponding to a speed of travel of the vehicle over a surface according to a value of a speed of a wheel of the vehicle, the control system being operable to:
  cause a reduction in an amount of drive torque applied to at least one of a plurality of driven wheels;
  obtain a value of a speed of rotation of the at least one wheel whilst the amount of drive torque applied thereto is reduced; and
  determine the vehicle speed value according to the measured value of wheel speed, wherein the system is configured to determine whether the vehicle speed value obtained according to the speed of the wheel following the reduction in torque applied to the wheel is consistent with one or more vehicle speed measurements made by alternative means.

The alternative means may comprise a second speed measurement apparatus. The second speed measurement apparatus may comprise a camera system, an accelerometer system, a radar system, an ultrasonic transmitter/sensor system or any other suitable apparatus.

It is to be understood that by drive torque is meant positive torque applied to a wheel in such a direction as to promote travel of the vehicle in the direction of travel of the vehicle. It is anticipated that the positive torque will typically be applied by means of a vehicle powertrain, for example by means of an engine or electric motor.

Embodiments of the invention have the advantage that a more reliable estimation of vehicle speed may be made using an existing speed measurement infrastructure of a vehicle. This is accomplished by reducing the amount of torque applied to at least one driven wheel and subsequently measuring the speed of rotation of the at least one wheel whilst the amount of torque is reduced. This has the advantage that a risk that the speed of rotation of the at least one wheel is measured whilst the wheel is slipping, whereby a false measure of vehicle speed is made, is reduced.

It is to be understood that the stored speed value corresponding to a speed of the vehicle over ground responsive to the measured value of wheel speed may be in the form of a wheel speed (for example measured in radians per unit time, revolutions per unit time) or a vehicle ground speed corresponding to the wheel speed (for example measured in meters per unit time, miles per unit time or the like). Other arrangements are also useful.

Reference to a driven wheel herein is to be understood to mean reference to a wheel that is arranged to be driven.

It is to be understood that in some embodiments the speed value may be stored by the control system. In addition or instead a most recent value of the speed value may be output by the controller 140 substantially continuously.

The control system may be operable to store a value of vehicle speed value. The stored value may be a value determined according to wheel speed before the reduction in drive torque is caused. Alternatively the stored value may be a value determined by the alternative means.

The system may be operable to update the stored value of vehicle speed value in dependence on a result of the determination whether the vehicle speed value obtained according to the speed of the wheel following the reduction in torque applied to the wheel is consistent with one or more vehicle speed measurements made by alternative means.

In one aspect of the invention for which protection is sought there is provided a control means for a motor vehicle, the control means being operable to determine a speed of travel of the vehicle over a surface according to a measurement of a speed of a wheel that is arranged to be driven,
when it is required to verify or determine measured vehicle speed the control means being configured automatically to:
reduce an amount of torque applied to at least one of a plurality of driven wheels;
measure a speed of rotation of the at least one wheel whilst the amount of torque applied to the at least one wheel is reduced; and
update a speed value corresponding to a speed of the vehicle over ground responsive to the measured value of wheel speed.

The term control means as used herein is intended to include, without limitation, a controller such as a microprocessor or the like.

Advantageously the control means may be operable to control a motor vehicle having at least one driven front wheel and at least one driven rear wheel, the control means being operable to reduce the torque applied to the at least one front driven wheel of the vehicle and not to the at least one driven rear wheel when it is required to verify vehicle speed.

It is to be understood that if a vehicle is experiencing relatively harsh acceleration, a net downward force on front wheels of the vehicle may in some embodiments be less than that on rear wheels of the vehicle. Consequently greater traction may be available from the rear wheels compared with the front wheels. By reducing drive torque to one or more front wheels and not to one or more rear wheels when it is required to check vehicle speed, an amount by which a rate of acceleration of the vehicle is compromised may be reduced.

The control means may be operable to control a vehicle having at least a pair or driven front wheels and at least a pair of driven rear wheels, the control means being operable to cause a reduction in the amount of drive torque applied to each wheel of the at least one pair of driven front wheels and not to the at least one pair of driven rear wheels.

In a conventional four wheel drive motor vehicle having a pair of driven front wheels, one on each side of the vehicle, the pair of driven front wheels may be considered to constitute the wheels of a front 'axle' even though each of the wheels may have its own respective axle (in order to allow steering) rather than a single axle connecting the two wheels. It is to be understood that in some embodiments, if an amount of torque applied to a front driven wheel of a front 'axle' is reduced, the amount of torque applied to each wheel of the front 'axle' is reduced. Thus if the front 'axle' has two wheels, the amount of torque applied to each of the two wheels of the front 'axle' is reduced.

The advantage of reducing torque applied to each wheel of a pair of driven wheels of a given 'axle' is that a risk that adverse asymmetric torque is generated when vehicle speed is checked, acting to induce adverse vehicle yaw, may be reduced.

The control means may be configured to reduce the torque applied to the at least one driven wheel by one selected from amongst a substantially fixed proportion of the total torque applied to the wheel, and a substantially fixed amount of torque.

Thus in some embodiments the control means may be configured to reduce the torque applied to the driven wheel by a proportion of the total torque, for example by 50% or by 80% or any other suitable proportion, including 100%. In some alternative embodiments the control means may be configured to reduce the torque applied to the driven wheel by a substantially fixed amount of torque, such as by 50 Nm, 100 Nm, 200 Nm or any other suitable value.

Further optionally the control means may be configured to reduce the torque applied to the driven wheel to a value below a traction limit of that wheel.

Advantageously the control means may be configured to determine whether a vehicle speed corresponding to the wheel speed measured following the reduction in torque applied to the wheel is consistent with one or more vehicle speed measurements made by alternative means.

Further advantageously, if the vehicle speed corresponding to the wheel speed measured following the reduction in torque applied to the wheel is not consistent with one or more vehicle speed measurements made by alternative means the control means may be operable to reduce an amount of torque applied to the at least one of the plurality of driven wheels still further, subsequently to determine again whether the vehicle speed corresponding to the wheel speed measured following the further reduction in torque applied to the at least one wheel is consistent with one or more vehicle speed measurements made by alternative means.

The control means may be operable periodically to verify vehicle speed by automatically reducing an amount of torque applied to the at least one of the plurality of driven wheels, and measuring a speed of rotation of the at least one wheel whilst the amount of torque applied to the at least one wheel is reduced.

For example in some embodiments the control means may be arranged to reduce the amount of torque at prescribed intervals such as every 500 ms, 1000 ms or any other suitable interval.

The control means may be operable to measure vehicle speed by means of an accelerometer, the control means being configured periodically to verify vehicle speed measured using the accelerometer by reducing the amount of torque applied to at least one of the plurality of driven wheels; and measuring a speed of rotation of the at least one wheel whilst the amount of torque applied to the at least one wheel is reduced.

Thus the vehicle speed measured using the accelerometer may be checked by measuring the speed of rotation of the at least one wheel during a torque reduction event.

Advantageously the control means may be operable to reduce an amount of torque applied to at least one of a plurality of driven wheels and to measure a speed of rotation of the at least one wheel whilst the amount of torque applied to the at least one wheel is reduced when it is determined that an estimated value of vehicle speed is not consistent with a measured value of wheel speed.

The estimated value of vehicle speed may be a speed value stored in a memory of the control system as a reference vehicle speed. The reference vehicle speed may be employed by one or more vehicle systems requiring vehicle speed input such as a traction control system, a stability control system, an ABS braking system or any other vehicle system, controller or module.

The control means may be operable to assume a mode in which vehicle speed is verified at prescribed time intervals following launch of a vehicle from a substantially stationary condition.

The control means may be operable to assume a mode in which vehicle speed is verified at prescribed time intervals during periods in which a rate of increase of an amount of torque applied to one or more driven wheels exceeds a prescribed rate.

The control means may be operable to control the vehicle to reduce the amount of torque applied to the at least one of the plurality of driven wheels by reducing an amount of drive torque transmitted from a propulsion motor to the at least one wheel.

In some embodiments, disconnection of clutch means or slipping of clutch means may be employed to reduce the amount of torque transmitted.

Alternatively or in addition the control means may be operable to control the vehicle to reduce the amount of torque applied to the at least one of the plurality of driven wheels by reducing an amount of drive torque generated by a propulsion motor.

The control means may be operable to control the vehicle to reduce the amount of torque applied to the at least one of the plurality of driven wheels by application of brake means to the at least one of the plurality of driven wheels.

In a further aspect of the invention for which protection is sought there is provided a vehicle powertrain controller comprising control means as claimed in any preceding claim.

In a still further aspect of the invention for which protection is sought there is provided a vehicle comprising control means as claimed in any preceding claim.

Optionally each of a pair of front driven wheels and a pair of rear driven wheels may be provided with a respective propulsion motor.

Further optionally each of the propulsion motors comprises an electric propulsion motor.

It is to be understood that since electric propulsion motors can develop relatively high torque values. As such, embodiments of the invention are particularly useful in embodiments in which each of four or more wheels of the vehicle are provided with a respective electric propulsion motor. Known four wheel drive vehicles may be incapable of reducing torque to only a pair of front wheels of a vehicle and not a pair of rear wheels. As such, a rate of acceleration of the vehicle may be compromised if torque to the rear wheels is reduced in addition to or instead of torque to the front wheels when it is required to verify vehicle speed.

In one aspect of the invention there is provided a method of verifying speed of travel of a vehicle over a surface comprising:
  reducing automatically by means of control means an amount of torque applied to at least one of a plurality of driven wheels;
measuring automatically a speed of rotation of the at least one wheel whilst the amount of torque applied to the at least one wheel is reduced; and
updating a speed value corresponding to a speed of the vehicle over ground responsive to the measured value of wheel speed.

In a further aspect of the invention for which protection is sought there is provided a method of determining speed of travel of a vehicle over a surface implemented by a control system comprising:
  causing a reduction in an amount of drive torque applied to at least one of a plurality of driven wheels;
  obtaining a value of a speed of rotation of the at least one wheel whilst the amount of drive torque applied thereto is reduced; and
  determining the vehicle speed value according to the measured value of wheel speed, wherein the system is configured to determine whether the vehicle speed value obtained according to the speed of the wheel following the reduction in torque applied to the wheel is consistent with one or more vehicle speed measurements made by alternative means.

In an aspect of the invention there is provided control means for a motor vehicle, the control means being operable to determine a speed of travel of the vehicle over a surface according to a measurement of a speed of a wheel that is arranged to be driven,
  the control means being operable automatically to:
  reduce an amount of torque applied to at least one of a plurality of driven wheels;
  measure a speed of rotation of the at least one wheel whilst the amount of torque applied to the at least one wheel is reduced; and
  update a speed value corresponding to a speed of the vehicle over ground responsive to the measured value of wheel speed.

The control means may be configured subsequently to command restoration of the amount of torque applied to the at least one of the plurality of driven wheels to the value prior to the commanded reduction.

It is to be understood that embodiments of the present invention are applicable to vehicles having a prime mover in the form of an engine and/or one or more electric propulsion motors. Thus embodiments of the invention are applicable to conventional vehicles having a single prime mover in the form of an internal combustion engine, to electric vehicles, and to hybrid electric vehicles.

Within the scope of this application it is envisaged that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless there is incompatibility of features.

BRIEF DESCRIPTION OF THE DRAWINGS

Embodiments of the invention will now be described, by way of example only, with reference to the accompanying figures in which:

FIG. 2 is a flow diagram of a method of controlling a vehicle during launch from a stationary condition.

DETAILED DESCRIPTION

Figure 1:
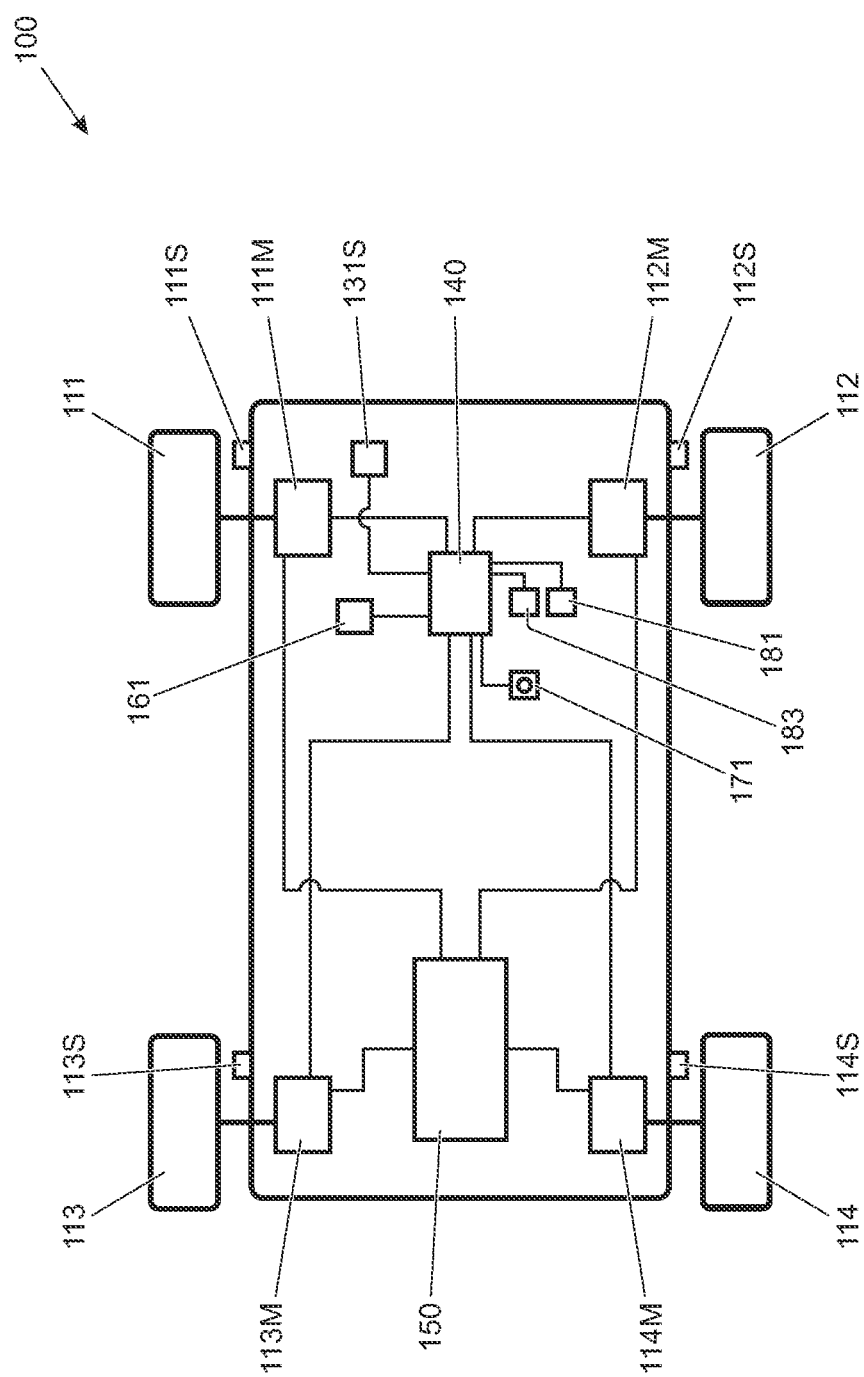
FIG. 1 is a schematic illustration of a vehicle according to an embodiment of the present invention.

FIG. 1 shows a four wheel drive motor vehicle 100 according to an embodiment of the present invention. The vehicle has four wheels 111, 112, 113, 114 each arranged to be driven by a respective electric propulsion motor 111M, 112M, 113M, 114M. The vehicle has a controller 140 configured to control an amount of torque delivered to each wheel 111, 112, 113, 114 by each respective motor individually. A battery 150 supplies power to drive the motors 111M, 112M, 113M, 114M.

The controller 140 is operable to control an amount of torque delivered by each of the motors 111M, 112M, 113M, 114M to its respective wheel responsive to a position of an accelerator pedal 181. An anti-lock braking system (ABS) controller 161 is configured to control braking of the vehicle 100 responsive to a position of a driver operated brake pedal 183.

The controller 140 is configured to execute a launch control functionality upon selection of a launch control mode by means of a selector 171. The launch control functionality is configured to optimise an amount of traction obtained when the vehicle accelerates from rest and is intended for use when relatively high rates of acceleration are required.

FIG. 2 illustrates steps of a process by which the controller 140 controls launch of the vehicle 100 when launch control mode is selected.

At step S101 the vehicle 100 is held stationary by the driver by means of the brake pedal 183 with launch control mode not selected. In the present embodiment, the driver is also required to depress the accelerator pedal 181 in order to allow selection of launch control mode. Provided the brake pressure exceeds a threshold value brakepressure_hold and the accelerator pedal is depressed beyond a threshold position value accel_min the controller 140 allows the driver to select launch control mode at step S103 (which may be referred to as 'launch phase 1'.

With launch control mode selected the controller 140 moves to step S105 at which the controller calculates a value of a gradient parameter grad_param corresponding to a gradient of a driving surface on which the vehicle is standing. The value or grad_param is calculated by reference to a signal from a vehicle inclination sensor although other methods are also useful. For example the value of grad_param may be determined by reference to a map database if the location of the vehicle 100 is known, for example by mean of a global satellite positioning system (GPS) module or cellular network location determining system. The measured value of gradient parameter is used to correct a value of longitudinal acceleration measured using a longitudinal acceleration sensor, for variations in measured longitudinal acceleration due to non-zero gradient of a driving surface, as discussed further below. In some embodiments, because the vehicle 100 is stationary at this stage the controller 140 may instead or in addition calibrate a longitudinal acceleration sensor at this time, for example by recording a signal level output by the sensor as a 'zero reference' or offset signal.

Whilst the vehicle is held stationary with the brake pedal 183 and accelerator pedal 181 depressed as described above an amount of torque developed by the powertrain increases. This stage may be referred to as 'launch phase 2'.

At step S107, the driver releases the brake pressure by releasing the brake pedal 183 and continues to maintain the accelerator pedal 181 at a position that is at or beyond position value accel_min, i.e. the accelerator pedal 181 must be depressed by at least this amount.

In some alternative embodiments the controller 140 may be configured to require only that the brake pedal pressure is at or above brakepressure_hold in order to allow launch control mode to be selected. Thus the controller 140 may allow the accelerator pedal 181 to be depressed after the brake pedal 183 has been released, and still remain in launch control mode.

At step S109 the controller 140 commences launch phase 3. At step S111 the controller 140 starts a timer.

At step S115 a value of gradient corrected longitudinal acceleration gradcorr_longacc is determined based on gradient as determined at step S105 and a value of longitudinal acceleration of the vehicle 100 received from a longitudinal acceleration sensor 131S.

The value of gradcorr_longacc is used at step S117 to calculate an integrated value of gradcorr_longacc. At step S119 a value of vehicle speed over ground, gnd_speed, is determined based on the integrated value of gradcorr_longacc.

It is to be understood that the parameter gnd_speed is stored in a memory of the controller 140 at step S121 as a current 'best estimate' of vehicle speed over ground. The value is used as a reference speed value when performing stability control operations including traction control operations. It is also used by the ABS controller 161 to perform brake control functionality if required.

At step S123 the controller 140 determines whether the speed of the vehicle over ground given by parameter gnd_speed exceeds a minimum threshold speed above which vehicle wheel speed sensors may be employed to provide a reliable value of wheel speed. This threshold speed is given by parameter wheel_sensor_min. In some embodiments the value of wheel_sensor_min is around 1.6 km/h; it is to be understood that in other embodiments the value of wheel_sensor_min may be different.

If the value of gnd_speed exceeds 1.6 km/h, the controller 140 is configured to perform a vehicle speed check at prescribed time intervals. In the present embodiment the controller 140 performs the speed check at 500 ms intervals, i.e. twice per second.

The speed check begins at step S125. At this step the controller 140 commands a reduction in the amount of torque applied to the front wheels 111, 112 of the vehicle by means of respective motors 111M, 112M. In the present embodiment the amount of torque developed by the motors 111M, 112M is reduced by 80% per motor for a period of 50 ms. This period may be referred to as a 'torque down' period. It is to be understood that other values of percentage decrease other than 80% may be used, such as 20%, 40%, 50%, 60% or any other suitable value. Similarly, other values of torque down period may be employed, such as 25 ms, 100 ms or any other suitable value.

In some alternative embodiments the amount of torque developed is reduced by a fixed amount, for example by 50 Nm, 100 Nm, 150 Nm, 200 Nm or any other suitable value provided that a negative torque is not applied. In some embodiments a negative torque may be applied, for example in order to reduce a speed of rotation of the wheels 111, 112 more quickly.

At the end of the torque down period the amount of torque delivered by the motors 111M, 112M is restored to the value prior to commencement of the torque down period.

However, during the torque down period, before the torque down period expires, at step S127 an average speed of rotation of the front wheels 111, 112 is determined by means of wheel speed sensors 111S, 112S.

In some embodiments, during the torque down period the amount of torque applied to a wheel may be reduced until a speed of the wheel is found to be consistent with one or more other measurements in respect of expected vehicle speed or acceleration.

For example, one way of assessing whether a wheel may be spinning is to determine whether an amount of acceleration of the vehicle as determined by means of (say) an accelerometer is consistent with the total amount of torque being applied to wheels of the vehicle, if the amount of acceleration measured by the accelerometer is less than the value expected for the total amount of torque being applied to the wheels, the controller may determine that one or more of the driven wheels may be slipping. The controller may determine (or be provided with an indication of) the expected speed of the vehicle based on the amount of acceleration as measured by the accelerometer as in the present embodiment. During the torque reduction period the controller may command a reduction in torque applied to a driven wheel until a speed of the driven wheel is consistent with the expected speed of the vehicle, allowing for a suitable amount of slip (or substantially no slip in some embodiments).

If the amount of torque applied to the wheel falls below a prescribed value or falls by a prescribed amount and the wheel speed is still not consistent with the expected vehicle speed, the controller may be configured to determine that the expected vehicle speed is incorrect and to determine that in fact the speed of the wheel during the torque down period corresponds to the true vehicle speed. The controller may be configured to update a stored value of vehicle speed (and/or a value of vehicle speed output by the controller) to correspond to the newly determined, corrected value of vehicle speed. Other arrangements are also useful.

In some embodiments the controller may determine an amount by which the torque applied to the driven wheel should be reduced in order to obtain a wheel speed corresponding to the current expected value of vehicle speed. The controller may be arranged to decrease the torque applied to the wheel by this amount, or by an amount up to this amount and to verify whether the wheel speed falls to a value corresponding to the current expected value of vehicle speed. If the wheel speed does fall to such a value, the controller may determine that the current expected value of vehicle speed is correct. If it does not, the controller may determine that the current expected value of vehicle speed is incorrect, and take steps to correct the current expected value of vehicle speed.

In some embodiments, the controller 140 may be configured to reduce an amount of torque applied to a wheel until a rate of change in wheel speed as torque is reduced falls below a prescribed value. When this condition exists the controller 140 may determine that the wheel speed now corresponds substantially to vehicle speed. If a discrepancy exists between the current expected value of vehicle speed and wheel speed at this stage the controller may be arranged to update the current expected value of vehicle speed to a value corresponding to the newly measured value of wheel speed.

At step S129 a corrected value of vehicle ground speed is determined assuming the speed of rotation of the front wheels 111, 112 as determined at step 127 corresponds to the vehicle ground speed. The value of parameter gnd_speed is set to correspond to this speed. The controller 140 then returns to step S117 at which step the controller 140 continues to determine vehicle speed by integrating updated values of gradcorr_longacc determined at step S115. The controller 140 may employ the updated value of gnd_speed as a starting value of ground speed for the calculations of vehicle speed.

It is to be understood that in some embodiments steps S123, S125, S127 and S129 may be performed only as part of a launch control function of the controller 140. In some alternative embodiments steps S123, S125, S127 and S129 may be performed whenever the controller 140 determines that a discrepancy may exist between a speed of the vehicle as determined by integration of the value of gradcorr_longacc and a speed as determined by reference to front wheel speed sensors 111S, 112S. In some embodiments reference may be made to rear wheel speed sensors 113S, 114S in addition or instead.

In some embodiments steps S123, S125, S127 and S129 may be performed whenever a driver requests acceleration of the vehicle. The controller 140 may be configured to determine that the driver is requesting acceleration responsive to a position of the accelerator pedal 181. Other arrangements are also useful.

Embodiments of the invention may be useful in situations in which a vehicle is required to accelerate rapidly from rest, or accelerate rapidly whilst moving. Some embodiments may also be useful in heavy vehicle applications and/or for vehicles that are towing a load. This is because wheel slip may be a particular problem in such situations where relatively high values of drive torque are required to be applied to one or more wheels.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a motor vehicle, the control system being operable to determine a vehicle speed value corresponding to a speed of travel of the vehicle over a surface according to a value of a speed of a wheel of the vehicle, the control system being operable to:
   cause a reduction in an amount of drive torque applied to at least one of a plurality of driven wheels;
   obtain a value of a speed of rotation of the at least one wheel whilst the amount of drive torque applied thereto is reduced; and
   determine the vehicle speed value according to the measured value of wheel speed, wherein the system is configured to determine whether the vehicle speed value obtained according to the speed of the wheel following the reduction in torque applied to the wheel is consistent with one or more vehicle speed measurements made by alternative means.

2. A control system as claimed in claim 1 operable to control a motor vehicle having at least one driven front wheel and at least one driven rear wheel, the control system being operable to cause a reduction in the amount of drive torque applied to the at least one driven front wheel of the vehicle and not to the at least one driven rear wheel when it is required to verify vehicle speed.

3. A control system as claimed in claim 2 operable to control a vehicle having at least a pair of driven front wheels and at least a pair of driven rear wheels, the control system being operable to cause a reduction in the amount of drive torque applied to each wheel of the at least one pair of driven front wheels and not to the at least one pair of driven rear wheels.

4. A control system as claimed in claim 1 configured to cause a reduction in the drive torque applied to the at least one driven wheel by one selected from amongst a substantially fixed proportion of the total drive torque applied to the wheel, and a substantially fixed amount of torque.

5. A control system as claimed in claim 1 configured to cause a reduction in the drive torque applied to the driven wheel to a value below a traction limit of that wheel.

6. A control system as claimed in claim 1 wherein if the vehicle speed obtained according to the wheel speed measured following the reduction in drive torque applied to the wheel is not consistent with one or more vehicle speed measurements made by alternative means the control system is operable to reduce an amount of drive torque applied to the at least one of the plurality of driven wheels still further, subsequently to determine again whether the vehicle speed according to the wheel speed measured following the further reduction in torque applied to the at least one wheel is consistent with one or more vehicle speed measurements made by alternative means.

7. A control system as claimed in claim 1 operable periodically to determine vehicle speed by automatically reducing an amount of drive torque applied to the at least one of the plurality of driven wheels, and measuring a speed of rotation of the at least one wheel whilst the amount of torque applied to the at least one wheel is reduced.

8. A control system as claimed in claim 1 operable to measure vehicle speed by means of an accelerometer, the control system being configured periodically to verify vehicle speed measured using the accelerometer by reducing the amount of torque applied to at least one of the plurality of driven wheels; and measuring a speed of rotation of the at least one wheel whilst the amount of torque applied to the at least one wheel is reduced.

9. A control system as claimed in claim 1 operable to reduce an amount of torque applied to at least one of a plurality of driven wheels and to measure a speed of rotation of the at least one wheel whilst the amount of torque applied to the at least one wheel is reduced when it is determined that an estimated value of vehicle speed is not consistent with vehicle speed measured according to a value of wheel speed.

10. A control system as claimed in claim 1 operable to assume a mode in which vehicle speed is verified at prescribed time intervals following launch of a vehicle from a substantially stationary condition.

11. A control system as claimed in claim 1 operable to assume a mode in which vehicle speed is determined at prescribed time intervals during periods in which a rate of increase of an amount of torque applied to one or more driven wheels exceeds a prescribed rate.

12. A control system as claimed in claim 1 operable to control the vehicle to reduce the amount of torque applied to the at least one of the plurality of driven wheels by reducing an amount of drive torque transmitted from a propulsion motor to the at least one wheel.

13. A control system as claimed in claim 1 operable to control the vehicle to reduce the amount of torque applied to the at least one of the plurality of driven wheels by reducing an amount of drive torque generated by a propulsion motor.

14. A control system as claimed in claim 1 operable to control the vehicle to reduce the amount of torque applied to the at least one of the plurality of driven wheels by application of brake means to the at least one of the plurality of driven wheels.

15. A vehicle powertrain comprising a control system as claimed in claim 1.

16. A vehicle comprising a control system as claimed in claim 1.

17. A vehicle as claimed in claim 16 wherein each of a pair of front driven wheels and a pair of rear driven wheels is provided with a respective propulsion motor.

18. A vehicle as claimed in claim 17 wherein each of the propulsion motors comprises an electric propulsion motor.

19. A method of determining speed of travel of a vehicle over a surface implemented by a control system comprising:
 causing a reduction in an amount of drive torque applied to at least one of a plurality of driven wheels;
 obtaining a value of a speed of rotation of the at least one wheel whilst the amount of drive torque applied thereto is reduced; and
 determining the vehicle speed value according to the measured value of wheel speed, wherein the system is configured to determine whether the vehicle speed value obtained according to the speed of the wheel following the reduction in torque applied to the wheel is consistent with one or more vehicle speed measurements made by alternative means.

\* \* \* \* \*